No. 859,813.

PATENTED JULY 9, 1907.

A. N. HARTMANN.
PROTECTED ELASTIC PACKING.
APPLICATION FILED APR. 13, 1906.

WITNESSES:
Wm. D. Bell
A. Glatt

INVENTOR,
Adam Nicholaus Hartmann,
BY
Gartner Leuward,
ATTORNEYS.

UNITED STATES PATENT OFFICE.

ADAM N. HARTMANN, OF PATERSON, NEW JERSEY.

PROTECTED ELASTIC PACKING.

No. 859,813.  Specification of Letters Patent.  Patented July 9, 1907.

Application filed April 13, 1906. Serial No. 311,412.

*To all whom it may concern:*

Be it known that I, ADAM NICHOLAUS HARTMANN, a subject of the German Emperor, residing in Paterson, county of Passaic, State of New Jersey, have invented certain new and useful Improvements in Protected Elastic Packing and Methods of Producing the Same; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has for its object to provide a packing for pipe joints, piston rods, etc. which, while having elasticity in sufficient degree to perform perfectly its function as a packing, shall be proof against deteriorating influences, such as corrosion from contact with water, oil and other liquids, or gases, electrolysis, as when used as a packing in water-pipes near electric conductors, etc.

Figure 1:
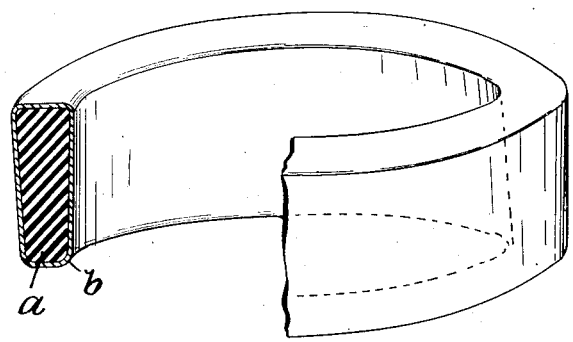
Figure 2:
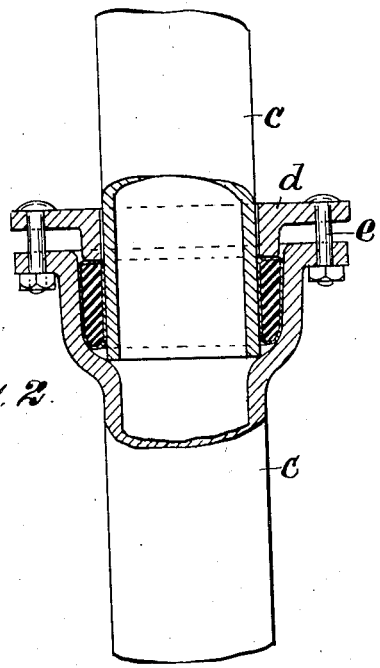

In the accompanying drawing, wherein my invention is fully shown, Figure 1 shows my improved packing in the form of a packing ring partly in section; and, Fig. 2 shows said packing used as a packing ring in a pipe joint.

There are many instances in which rubber, caoutchouc, guttapercha and the like, make an important, if not an essential, element for use in forming packings, largely because of their elasticity. On the other hand, these substances are subject to deterioration by the action of various liquids and gases, and also by electrolysis, so that any elasticity which they may initially have is soon impaired and ultimately their efficiency is entirely destroyed.

My invention therefore contemplates so forming the packing that, while retaining its essential qualities as a packing, it will be protected against deteriorating influences. To this end, with rubber, caoutchouc, guttapercha or the like as an essential ingredient, I form a body in substantially the shape in which it is to be used as a packing, for instance, in the shape of a ring, incorporating also with it graphite or some such other material as has the qualities of forming a cathode in an electro-depositing apparatus and of adhering well in or to said body; the cathode substance is preferably rubbed on the surface of the body, in which instance, graphite, being plastic and capable of adapting itself to the minutest irregularities of a surface, is a very desirable form of the cathode both in point of convenience and in point of forming a perfect binder between said body and the coating therefor now to be described. The thus charged body is then placed in an electro-depositing bath, together with a suitable metal, such as copper, as the anode, whereupon, the anode and cathode being placed in circuit with a suitable source of electric energy, the resulting electro-deposition leaves a coating or deposit of metal on the said body.

In the drawings, Fig. 1, the part $a$ designates the core of the packing, the same comprising in this instance, rubber, caoutchouc, guttapercha or the like charged with, say, graphite by having the same rubbed onto the surface thereof; $b$ is the metallic layer which is deposited on the core $a$ as the result of the electro-depositing operation.

Fig. 2 shows the finished article used as a packing in the joint between two pipe sections $c$, $d$ being a ring which, by the bolts $e$, acts to crowd the packing snugly into the joint.

Having thus fully described my invention, what I claim as new and desire to secure by Letters Patent is:

1. The method of producing elastic protected packing which consists in forming, in the desired shape, a body comprising an elastic substance as its main ingredient, rubbing an adhesive cathode substance on said body to form thereon a superficial binder or coating, placing the thus coated body and a suitable anode in an electro-depositing bath, and then electrically connecting said body and the anode with a source of electrical energy, whereby to produce a protecting coating on said body, substantially as described.

2. The method of producing elastic protected packing which consists in forming in the desired shape a body comprising an elastic substance as its main ingredient, rubbing graphite on said body to form a superficial cathode coating or binder, placing the thus coated body and a suitable anode in an electro-depositing bath, and then electrically coating said body and the anode with a source of electrical energy, whereby to produce a protecting coating on said body, substantially as described.

In testimony, that I claim the foregoing, I have hereunto set my hand this 10th day of April 1906.

ADAM N. HARTMANN.

Witnesses:
JOHN W. STEWARD,
ALFRED GARTNER.